US012697735B2

(12) United States Patent
Priest

(10) Patent No.: US 12,697,735 B2
(45) Date of Patent: Aug. 4, 2026

(54) ROBOT SYSTEM HOUSED ON CELL SITES AND TOWERS

(71) Applicant: ETAK Systems, LLC, Huntersville, NC (US)

(72) Inventor: Lee Priest, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 684 days.

(21) Appl. No.: 17/860,503

(22) Filed: Jul. 8, 2022

(65) Prior Publication Data

US 2022/0347856 A1     Nov. 3, 2022

Related U.S. Application Data

(63) Continuation-in-part of application No. 15/671,439, filed on Aug. 8, 2017, now abandoned, and a continuation-in-part of application No. 15/248,634, filed on Aug. 26, 2016, now Pat. No. 10,227,134, and a continuation-in-part of application No. 15/205,313, (Continued)

(51) Int. Cl.
| | |
|---|---|
| *B25J 11/00* | (2006.01) |
| *B25J 13/00* | (2006.01) |
| *B25J 15/06* | (2006.01) |
| *B64U 10/14* | (2023.01) |
| *B64U 30/299* | (2023.01) |
| *B64U 101/30* | (2023.01) |
| *B64U 101/67* | (2023.01) |
| *H04N 7/18* | (2006.01) |
| *H04N 23/57* | (2023.01) |

(52) U.S. Cl.
CPC ............. *B25J 11/00* (2013.01); *B25J 13/006* (2013.01); *B25J 15/0608* (2013.01); *B64U 10/14* (2023.01); *B64U 30/299* (2023.01); *B64U 2101/30* (2023.01); *B64U 2101/67* (2023.01); *H04N 7/181* (2013.01); *H04N 23/57* (2023.01)

(58) Field of Classification Search
CPC ...... B25J 11/00; B25J 13/006; B25J 15/0608; B64U 10/14
USPC ......................................................... 455/445
See application file for complete search history.

(56) References Cited

U.S. PATENT DOCUMENTS

| | | | |
|---|---|---|---|
| 7,496,454 B2 * | 2/2009 | Rogers ................... | G01R 33/44 |
| | | | 702/33 |
| 9,527,605 B1 * | 12/2016 | Gentry ................. | G05D 1/0094 |

(Continued)

*Primary Examiner* — Thomas J Lett
(74) *Attorney, Agent, or Firm* — Baratta Law PLLC; Lawrence A. Baratta, Jr.; Ryan Odessa

(57) ABSTRACT

In various embodiments, the present disclosure relates to robot systems configured to operate on a cell tower to inspect, install, reconfigure, and repair cellular equipment. The present disclosure provides a robot system for performing audit tasks of cell towers. The robot system includes a docking station secured to the cell tower adapted to house a robot when the robot is not in use, and a robot including a body portion configured to hold various electronic components of the robot including monitoring equipment disposed thereon, one or more arms extending from the body portion adapted to manipulate components of a cell tower and to facilitate movement of the robot on the cell tower, and wireless interfaces adapted to allow wireless control of the robot. The robot is configured to be controlled by one of a user in a remote location, a user at the cell tower site, and autonomously.

18 Claims, 11 Drawing Sheets

Related U.S. Application Data filed on Jul. 8, 2016, now Pat. No. 10,384,804, and a continuation-in-part of application No. 15/190,450, filed on Jun. 23, 2016, now Pat. No. 9,654,984, and a continuation-in-part of application No. 15/175,314, filed on Jun. 7, 2016, now Pat. No. 10,327,151, and a continuation-in-part of application No. 15/131,460, filed on Apr. 18, 2016, now Pat. No. 9,764,838, and a continuation-in-part of application No. 14/736,925, filed on Jun. 11, 2015, now Pat. No. 9,669,945, and a continuation-in-part of application No. 14/685,720, filed on Apr. 14, 2015, now Pat. No. 9,596,617.

(56) References Cited

U.S. PATENT DOCUMENTS

|  |  |  |  |
|---|---|---|---|
| 9,596,617 | B2 | 3/2017 | Priest et al. |
| 9,654,984 | B2 | 5/2017 | Priest et al. |
| 9,704,292 | B2 | 7/2017 | Priest et al. |
| 9,764,838 | B2 | 9/2017 | Priest |
| 9,881,416 | B2 | 1/2018 | Priest |
| 9,928,750 | B2 | 3/2018 | Priest |
| 9,947,135 | B2 | 4/2018 | Priest |
| 9,959,772 | B2 | 5/2018 | Priest |
| 9,988,140 | B2 | 6/2018 | Priest |
| 10,074,284 | B1 | 9/2018 | Priest |
| 10,109,205 | B2 | 10/2018 | Priest |
| 10,157,546 | B2 | 12/2018 | Godwin et al. |
| 10,187,806 | B2 | 1/2019 | Priest |
| 10,189,566 | B2 | 1/2019 | Terry et al. |
| 10,192,354 | B2 | 1/2019 | Terry et al. |
| 10,227,134 | B2 | 3/2019 | Priest |
| 10,231,133 | B2 | 3/2019 | Priest et al. |
| 10,312,994 | B2 | 6/2019 | Priest |
| 10,327,151 | B2 | 6/2019 | Priest et al. |
| 10,334,164 | B2 | 6/2019 | Terry et al. |
| 10,354,441 | B2 | 7/2019 | Godwin et al. |
| 10,382,975 | B2 | 8/2019 | Priest |
| 10,395,434 | B2 | 8/2019 | Priest |
| 10,397,802 | B2 | 8/2019 | Priest |
| 10,456,906 | B2 | 10/2019 | Priest et al. |
| 10,475,239 | B1 | 11/2019 | Priest |
| 10,497,112 | B2 | 12/2019 | Hummer et al. |
| 10,580,199 | B2 | 3/2020 | Priest et al. |
| 10,650,582 | B2 | 5/2020 | Priest et al. |
| 10,713,961 | B2 | 7/2020 | Priest |
| 10,720,652 | B2 | 7/2020 | Perry et al. |
| 10,723,483 | B2 | 7/2020 | Priest et al. |
| 10,728,767 | B2 | 7/2020 | Priest et al. |
| 10,789,853 | B2 | 9/2020 | Priest |
| 10,827,363 | B2 | 11/2020 | Terry et al. |
| 10,856,153 | B2 | 12/2020 | Terry et al. |
| 10,959,107 | B2 | 3/2021 | Priest et al. |
| 11,101,517 | B2 | 8/2021 | Hummer et al. |
| 2011/0180667 | A1* | 7/2011 | O'Brien ................. B64U 10/60 |
|  |  |  | 244/135 R |
| 2012/0226394 | A1* | 9/2012 | Marcus .................... A62B 5/00 |
|  |  |  | 701/2 |
| 2012/0303179 | A1* | 11/2012 | Schempf ................. F41H 7/005 |
|  |  |  | 701/2 |
| 2016/0309341 | A1 | 10/2016 | Priest et al. |
| 2016/0320775 | A1 | 11/2016 | Priest |
| 2016/0360428 | A1 | 12/2016 | Priest |
| 2017/0199646 | A1 | 7/2017 | Priest |
| 2017/0257778 | A1 | 9/2017 | Priest |
| 2017/0358213 | A1 | 12/2017 | Priest |
| 2017/0358223 | A1 | 12/2017 | Priest |
| 2017/0358224 | A1 | 12/2017 | Priest |
| 2017/0358225 | A1 | 12/2017 | Priest |
| 2017/0366980 | A1 | 12/2017 | Priest et al. |
| 2018/0034017 | A1 | 2/2018 | Erickson et al. |
| 2018/0034022 | A1 | 2/2018 | Hummer et al. |
| 2018/0034036 | A1 | 2/2018 | Perry et al. |
| 2018/0044154 | A1 | 2/2018 | Priest |
| 2018/0047994 | A1 | 2/2018 | Perry et al. |
| 2018/0158236 | A1 | 6/2018 | Priest |
| 2018/0276995 | A1 | 9/2018 | Priest |
| 2018/0312348 | A1 | 11/2018 | Griffin et al. |
| 2018/0319497 | A1 | 11/2018 | Priest |
| 2018/0350245 | A1 | 12/2018 | Priest |
| 2019/0035285 | A1 | 1/2019 | Priest |
| 2019/0043368 | A1 | 2/2019 | Priest |
| 2019/0080619 | A1 | 3/2019 | Priest |
| 2019/0295427 | A1 | 9/2019 | Priest |
| 2019/0325760 | A1 | 10/2019 | Priest |
| 2019/0355262 | A1 | 11/2019 | Priest |
| 2019/0355263 | A1 | 11/2019 | Priest |
| 2020/0005651 | A1 | 1/2020 | Priest |
| 2020/0005652 | A1 | 1/2020 | Priest |
| 2020/0035110 | A1 | 1/2020 | Priest |
| 2020/0051445 | A1 | 2/2020 | Priest |
| 2020/0077164 | A1 | 3/2020 | Gentile et al. |
| 2020/0090527 | A1 | 3/2020 | Priest |
| 2020/0160730 | A1 | 5/2020 | Priest |
| 2020/0160734 | A1 | 5/2020 | Priest |
| 2020/0219407 | A1 | 7/2020 | Priest |
| 2020/0234600 | A1 | 7/2020 | Priest |
| 2020/0250998 | A1 | 8/2020 | Priest |
| 2020/0258401 | A1 | 8/2020 | Priest |
| 2020/0265727 | A1 | 8/2020 | Priest |
| 2020/0286390 | A1 | 9/2020 | Priest |
| 2020/0288330 | A1 | 9/2020 | Priest et al. |
| 2020/0354083 | A1 | 11/2020 | Priest |
| 2020/0354084 | A1 | 11/2020 | Priest |
| 2020/0354170 | A1 | 11/2020 | Priest |
| 2020/0355570 | A1 | 11/2020 | Priest |
| 2020/0355571 | A1 | 11/2020 | Priest |
| 2020/0355572 | A1 | 11/2020 | Priest |
| 2020/0391882 | A1 | 12/2020 | Terry et al. |
| 2020/0396361 | A1 | 12/2020 | Terry et al. |
| 2020/0396422 | A1 | 12/2020 | Terry et al. |
| 2020/0402318 | A1 | 12/2020 | Terry et al. |
| 2020/0404175 | A1 | 12/2020 | Terry et al. |
| 2021/0124851 | A1 | 4/2021 | Priest |
| 2021/0150096 | A1 | 5/2021 | Priest |
| 2021/0150097 | A1 | 5/2021 | Priest |
| 2021/0150098 | A1 | 5/2021 | Priest |

* cited by examiner

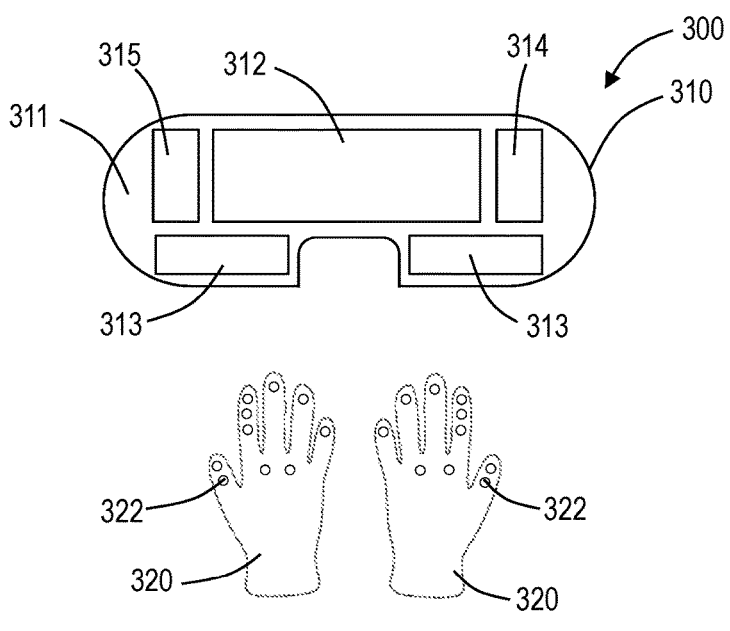
_FIG. 11_
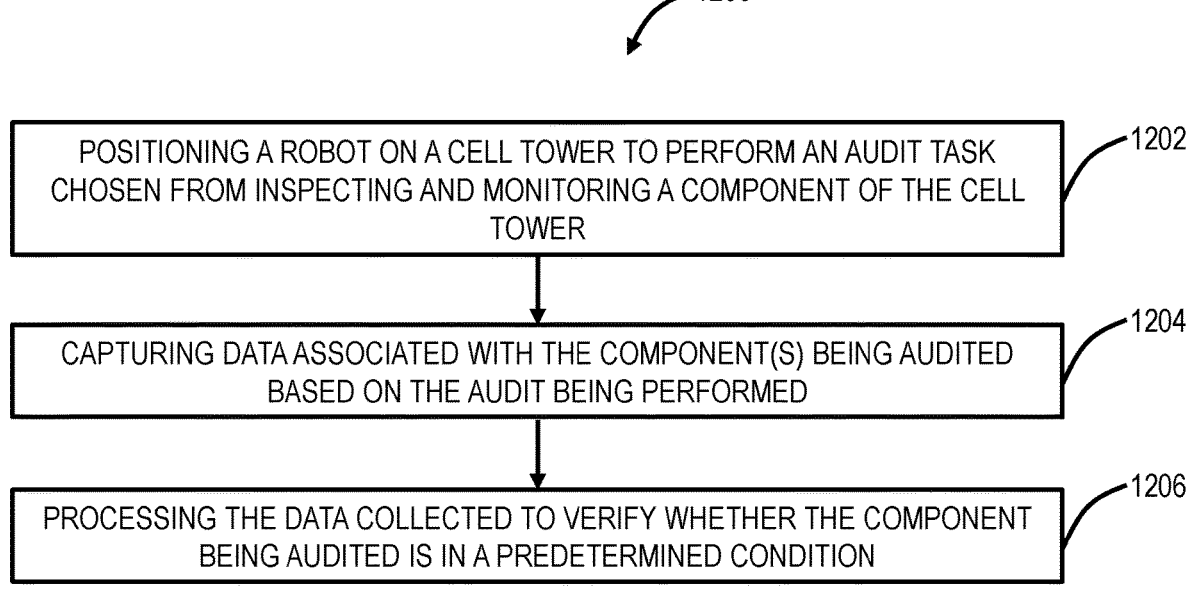
_FIG. 12_

PROVIDING COMPONENTS TO A ROBOT OF THE ROBOT SYSTEM — 1302

POSITIONING THE ROBOT ON THE CELL TOWER TO PERFORM THE MODIFICATION — 1304

UTILIZING THE CLAWS TO MODIFY THE EQUIPMENT UTILIZING THE COMPONENTS PROVIDED TO THE ROBOT — 1306

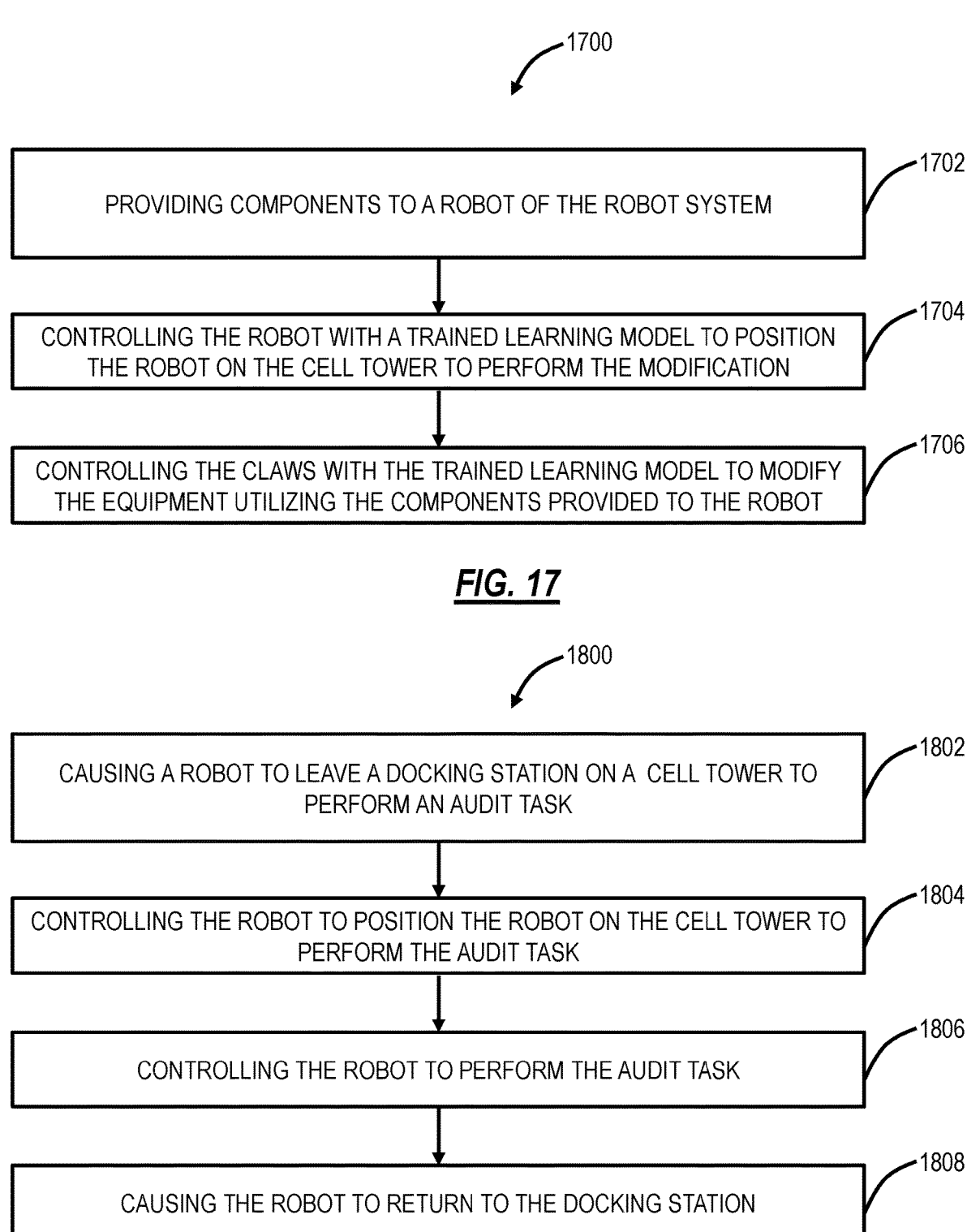

1700

1702
PROVIDING COMPONENTS TO A ROBOT OF THE ROBOT SYSTEM

1704
CONTROLLING THE ROBOT WITH A TRAINED LEARNING MODEL TO POSITION THE ROBOT ON THE CELL TOWER TO PERFORM THE MODIFICATION

1706
CONTROLLING THE CLAWS WITH THE TRAINED LEARNING MODEL TO MODIFY THE EQUIPMENT UTILIZING THE COMPONENTS PROVIDED TO THE ROBOT

1802
CAUSING A ROBOT TO LEAVE A DOCKING STATION ON A CELL TOWER TO PERFORM AN AUDIT TASK

1804
CONTROLLING THE ROBOT TO POSITION THE ROBOT ON THE CELL TOWER TO PERFORM THE AUDIT TASK

1806
CONTROLLING THE ROBOT TO PERFORM THE AUDIT TASK

1808
CAUSING THE ROBOT TO RETURN TO THE DOCKING STATION

*FIG. 18*

ROBOT SYSTEM HOUSED ON CELL SITES AND TOWERS

CROSS-REFERENCE TO RELATED APPLICATION(S)

The present patent/application is continuation-in-part of, and the content of each are incorporated by reference herein:

| Filing Date | Ser. No. | Title |
| --- | --- | --- |
| Aug. 8, 2017 | 15/671,439 | UNMANNED AERIAL VEHICLES LANDING ZONES AT CELL SITES |
| Aug. 26, 2016 | 15/248,634 | USING DRONES TO LIFT PERSONNEL UP CELL TOWERS |
| Jul. 8, 2016 | 15/205,313 | CELL TOWER INSTALLATION AND MAINTENANCE SYSTEMS AND METHODS USING ROBOTIC DEVICES |
| Jun. 23, 2016 | 15/190,450 | CELL TOWER INSTALLATION SYSTEMS AND METHODS WITH UNMANNED AERIAL VEHICLES |
| Jun. 7, 2016 | 15/175,314 | WIRELESS COVERAGE TESTING SYSTEMS AND METHODS WITH UNMANNED AERIAL VEHICLES |
| Apr. 18, 2016 | 15/131,460 | UNMANNED AERIAL VEHICLE-BASED SYSTEMS AND METHODS ASSOCIATED WITH CELL SITES AND CELL TOWERS WITH ROBOTIC ARMS FOR PERFORMING OPERATIONS |
| Jun. 11, 2015 | 14/736,925 | TETHERED UNMANNED AERIAL VEHICLE-BASED SYSTEMS AND METHODS ASSOCIATED WITH CELL SITES AND CELL TOWERS |
| Apr. 14, 2015 | 14/685,720 | UNMANNED AERIAL VEHICLE-BASED SYSTEMS AND METHODS ASSOCIATED WITH CELL SITES AND CELL TOWERS |

FIELD OF THE DISCLOSURE

The present disclosure generally relates to cell sites and robot systems. More particularly, the present disclosure relates to robot systems configured to operate on a cell tower to inspect, install, reconfigure, and repair cellular equipment.

BACKGROUND OF THE DISCLOSURE

Due to the geographic coverage nature of wireless service, there are hundreds of thousands of cell towers in the United States. For example, in 2014, it was estimated that there were more than 310,000 cell towers in the United States. Cell towers can have heights up to 1,500 feet or more. There are various requirements for cell site workers (also referred to as tower climbers or transmission tower workers) to climb cell towers to perform maintenance, audit, and repair work for cellular phone and other wireless communications companies. This is both a dangerous and costly endeavor. For example, between 2003 and 2011, 50 tower climbers died working on cell sites (see, e.g., www.pbs.org/wgbh/pages/frontline/social-issues/cell-tower-deaths/in-race-for-better-cell-service-men-who-climb-towers-pay-with-their-lives/). Also, OSHA estimates that working on cell sites is 10 times more dangerous than construction work, generally (see, e.g., www.propublica.org/article/cell-tower-work-fatalities-methodology). Furthermore, the tower climbs also can lead to service disruptions caused by accidents. Thus, there is a strong desire, from both a cost and safety perspective, to reduce the number of tower climbs by cell cite workers.

It would be advantageous to have a mechanism to allow cell site workers to reach up to a cell tower, without having to perform a dangerous tower climb. Any such mechanism requires safety, stability, accessibility, mobility, etc.

The above-described background relating to cell sites is merely intended to provide a contextual overview of some current issues and is not intended to be exhaustive. Other contextual information may become apparent to those of ordinary skill in the art upon review of the following description of exemplary embodiments.

BRIEF SUMMARY OF THE DISCLOSURE

In an embodiment, a robot system for performing audit tasks of cell towers is provided, the robot system including: a docking station secured to the cell tower adapted to house a robot when the robot is not in use; and a robot including a body portion configured to hold various electronic components of the robot further including monitoring equipment disposed thereon; one or more arms extending from the body portion adapted to manipulate components of a cell tower and to facilitate movement of the robot on the cell tower; and wireless interfaces adapted to allow wireless control of the robot. The robot is configured to receive power from the docking station. The docking station includes a tether, the tether being fixed to the robot and adapted to support the robot. The docking station includes one or more solar panels and batteries configured to obtain and store power for the robot. The docking station is configured to draw power from the cell tower. The one or more arms may further include claws adapted to grip tools and components of the cell tower. The claws may include image sensors disposed on a distal end of the claws for capturing image data of difficult to reach areas of the cell tower. The robot may further include magnets disposed on the body portion, wherein the magnets are one of permanent magnets and selectively enabled magnets adapted to secure the robot to the cell tower. The body portion may further include storage compartments configured to hold tools and equipment. The robot is adapted to operate in adverse weather conditions. The body portion may additionally include elongated compartments, wherein the one or more arms are configured to stow within the elongated compartments. The robot is configured to be controlled by one of a user in a remote location, a user at the cell tower site, and direct programing.

In another embodiment, a cell tower is provided, the cell tower includes: a docking station secured to the cell tower adapted to house a robot when the robot is not in use; and a robot including a body portion configured to hold various electronic components of the robot including monitoring equipment disposed thereon; one or more arms extending from the body portion adapted to manipulate components of a cell tower and to facilitate movement of the robot on the cell tower; and wireless interfaces adapted to allow wireless control of the robot. The robot is configured to receive power from the docking station. The docking station includes a tether, the tether being fixed to the robot and adapted to support the robot. The docking station includes one or more solar panels and batteries configured to obtain and store power for the robot. The docking station is configured to draw power from the cell tower. The plurality of operations can include any of inspecting and monitoring a component of the cell tower, performing repair, and installing components of the cell tower. The instructions can further cause the processor to utilize a Machine Learning (ML) model to learn and improve the robot's ability to work on the cell tower over time. The robot is configured to be controlled by one of a user in a remote location, a user at the cell tower site, and direct programing. The one or more arms can further include claws adapted to grip tools and components of the cell tower. Data can be captured by image sensors disposed on a distal end of the claws. The robot can further include magnets disposed on the body portion, wherein the magnets are one of permanent magnets and selectively enabled magnets adapted to secure the robot to the cell tower, and wherein the instructions further cause the processor to control the selectively enabled magnets. The body portion may further include storage compartments configured to hold tools and equipment. The robot may be adapted to operate in adverse weather conditions. The body portion further includes elongated compartments, wherein the one or more arms are configured to stow within the elongated compartments.

In a further embodiment, a method including the steps of causing a robot to leave a docking station on a cell tower to perform an audit task; positioning a robot on a cell tower to perform an audit task chosen from a plurality of operations to the cell tower; causing the robot to perform the audit task; and causing the robot to return to the docking station. The plurality of operations include any of inspecting and monitoring a component of the cell tower, performing repair, and installing components of the cell tower.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 11 is a block diagram of one embodiment of a Virtual Reality (VR) System for controlling the robot in accordance with the present disclosure.

FIG. 12 is a flow chart of an exemplary method for performing an audit of the cell site utilizing a robot system.

FIG. 17 is a flow chart of an exemplary method for providing components to a robot and modifying components of the cell site utilizing the robot system with a machine learning model.

FIG. 18 is a flow chart of an exemplary method for modifying components of the cell site utilizing a robot system that lives in a docking station on the cell tower.

DETAILED DESCRIPTION OF THE DISCLOSURE

In various embodiments, the present disclosure relates to robot systems configured to operate on a cell tower to inspect, install, reconfigure, and repair cellular equipment (audit tasks). The present disclosure provides a robot for performing audit tasks of cell towers. The robot includes a body portion configured to hold various electronic components of the robot including monitoring equipment disposed thereon, one or more arms extending from the body portion adapted to manipulate components of a cell tower and to facilitate movement of the robot on the cell tower, a tethering system adapted to prevent the robot from falling off of the cell tower, and wireless interfaces adapted to allow wireless control of the robot. The robot is configured to be controlled by one of a user in a remote location, a user at the cell tower site, and direct programing.

§ 1.0 Exemplary Cell Sites

Figure 1:
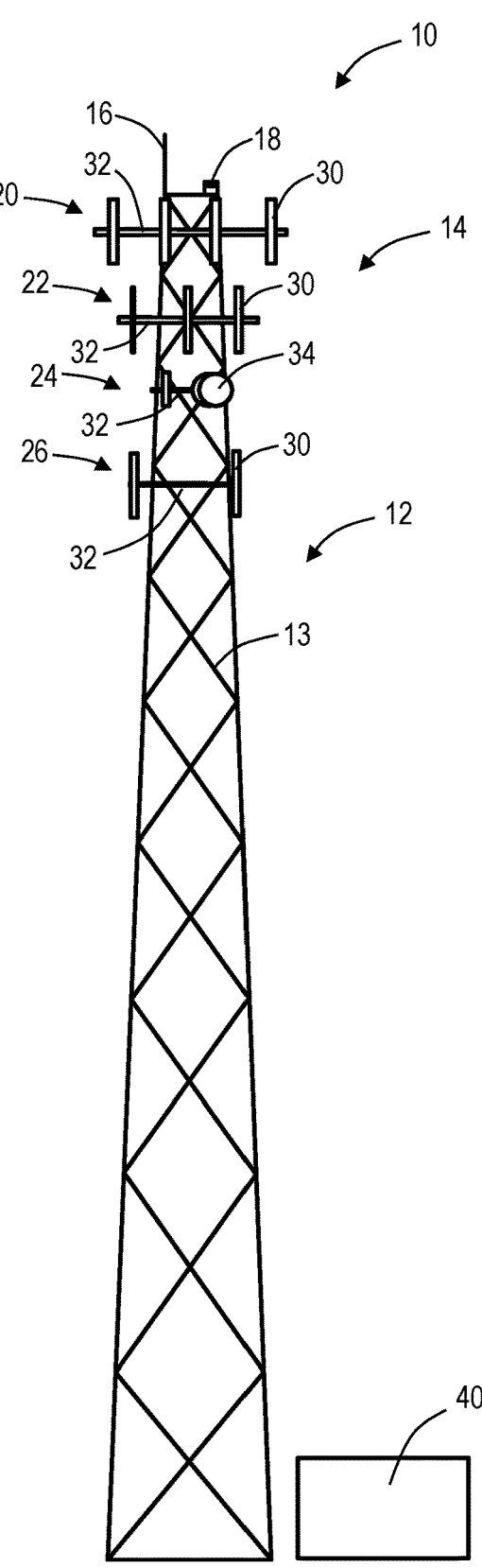
FIG. 1 is a schematic diagram of a cell site including a self supported cell tower.
Figure 2:
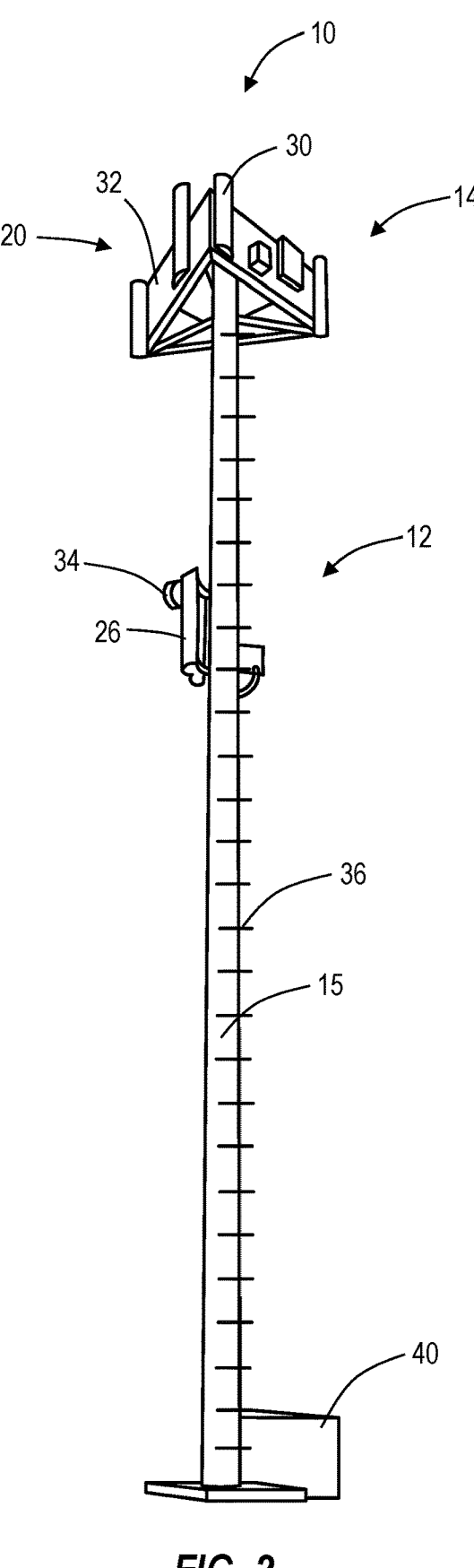
FIG. 2 is a schematic diagram of a cell site including a monopole cell tower.
Figure 3:
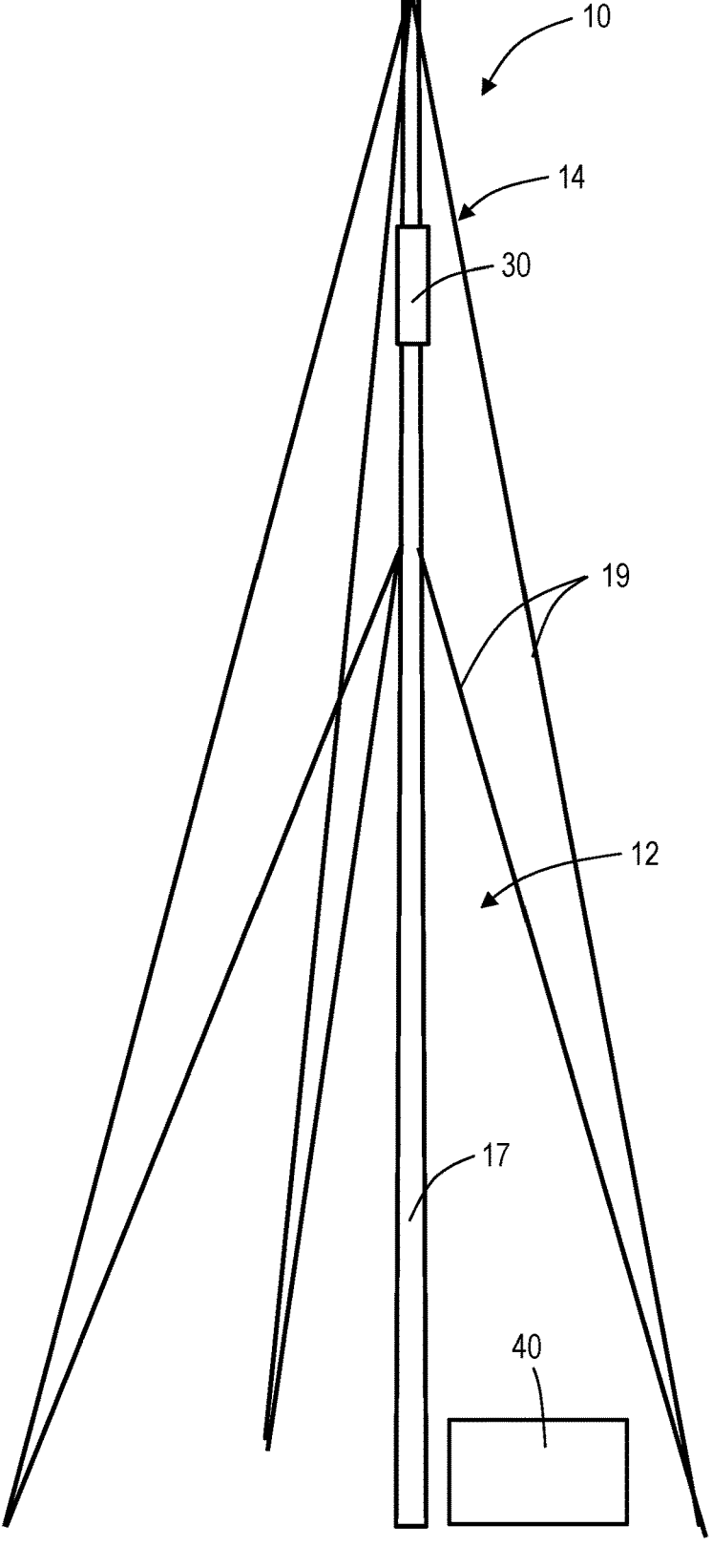
FIG. 3 is a schematic diagram of a cell site including a guy wire tower.

FIGS. 1-3 are schematic diagrams of a cell sites 10 including a cell tower 12. The cell tower 12 can be any type of elevated structure, such as 100-200 feet/30-60 meters tall. Referring to FIGS. 1-3, the figures illustrate different types of call towers 12 including a self supported cell tower, a monopole cell tower, and a guy wire tower respectively. These three types of towers 12 have different support mechanisms. Referring to FIG. 1, the tower 12 includes a self support tower that includes a lattice structure 13. The self support tower is free standing. Referring to FIG. 2, the tower 12 includes a monopole cell tower that is a single tube 15, which is also free standing. Referring to FIG. 3, the tower 12 includes a guy wire tower that includes straight rod 17 supported by tension cables 19. The tension cables 19 generally attach to the straight rod 17 at the same place at different heights on the straight rod 17, e.g., every 100', 200', etc.

Referring again to FIGS. 1-3, generally, the cell tower 12 is an elevated structure for holding cell site components 14. The cell tower 12 may also include a lightning rod 16, a warning light 18, etc. Of course, there may various additional components associated with the cell tower 12 and the cell site 10 which are omitted for illustration purposes. In exemplary embodiments, there are one or more sets 20, 22, 24, 26 of cell site components 14, such as for different wireless service providers. In these examples, the sets 20, 22, 24 include various antennas 30 for cellular service. The sets 20, 22, 24 are deployed in sectors, e.g., there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 34 which can be used to provide other types of wireless connectivity, besides cellular service. There may be other embodiments where the cell tower 12 is omitted and replaced with other types of elevated structures such as roofs, water tanks, etc.

In embodiments, one or more of the sets 20, 22, 24, 26 of cell site components 14 is supported by a radio center platform 32. Each of the radio center platforms 32 can be dedicated to one wireless service provider. In embodiments, the cell tower 12 includes climbing supports 36, such as pegs, clips, etc. for use by a worker to safely climb the tower 12.

To support the various cell site components and their operation thereof, the cell site 10 includes a shelter 40 (which can also be referred to as a cabinet, house, etc.) which include electronics and other networking equipment to support the functionality and operation of the cell site components 14.

§ 2.0 Robot System

Figure 4:
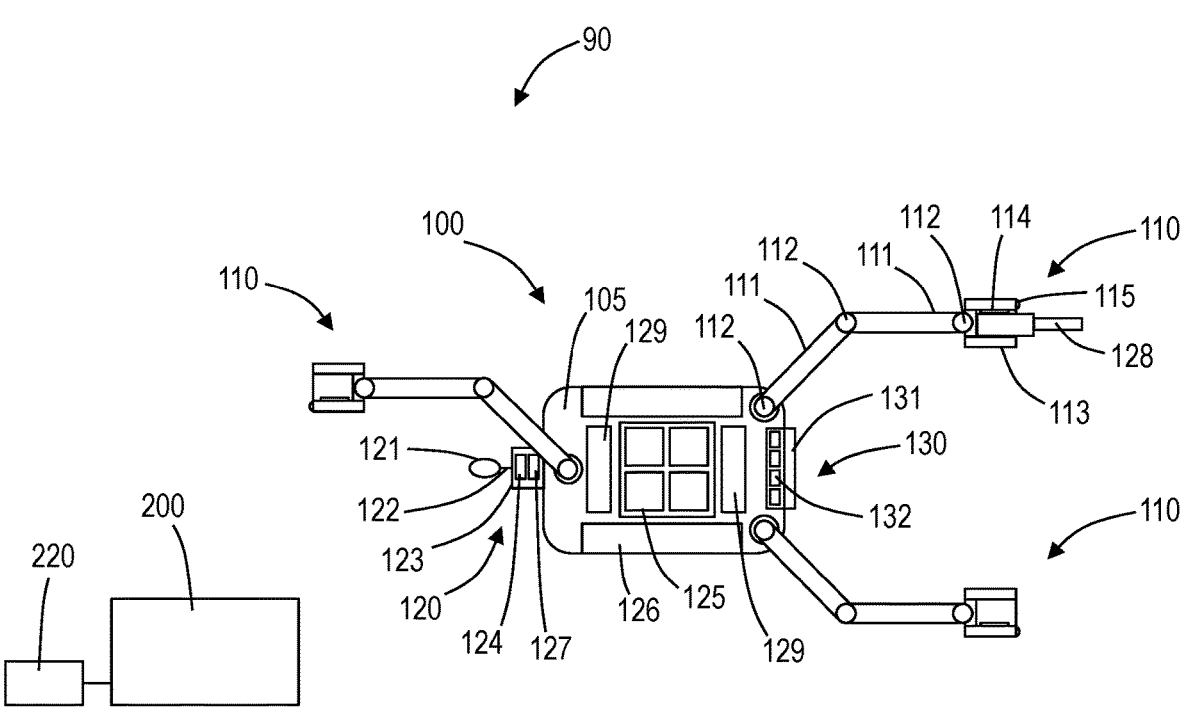
FIG. 4 is a schematic diagram of an exemplary robot system configured for inspecting, installing, reconfiguring, and repairing cellular equipment at a cell site in accordance with the present disclosure.
Figure 5:
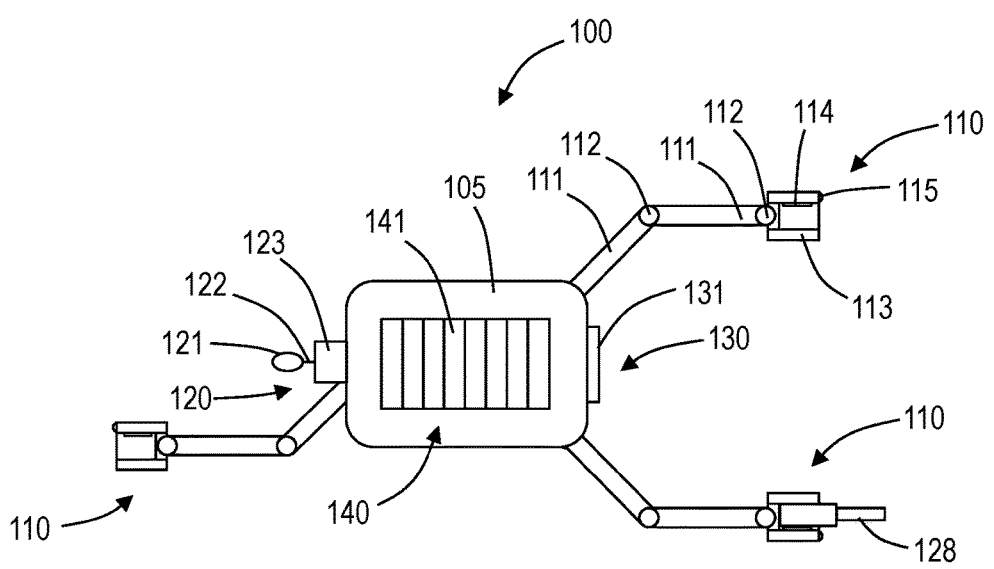
FIG. 5 is a schematic diagram of a robot of the robot system of FIG. 4 in accordance with the present disclosure.

FIG. 4 is a schematic diagram of an exemplary robot system 90 configured for inspecting, auditing, monitoring, installing, reconfiguring, and repairing cellular equipment 14 (refer to FIGS. 1-3) at a cell site 10 in accordance with the present disclosure. All of these activities are further referred to as audit tasks. FIG. 5 is a schematic diagram of the robot 100 of the robot system 90 of FIG. 4 in accordance with the present disclosure. Referring to FIGS. 4 and 5, in embodiments, the robot system 90 includes a controller 200 and a robot 100. The controller 200 is configured to control and schedule movements of the robot 100. In embodiments, the controller 200 includes an input system 220. In some embodiments, the input system 220 is a mouse and keyboard. In other embodiments, the input system 220 is a handheld controller. In further embodiments, the input system 220 is a Virtual Reality (VR) system.

In embodiments, the robot 100 includes a body 105, arms 110, and monitoring equipment 130. The body 105 is configured to support the arms 110 and is configured to hold the various electronic components of the robot (refer to FIG. 6). In embodiments, the body includes multiple magnets 141 positioned on a bottom thereof. In some embodiments, the magnets 141 are selectively enabled, such that the magnetism can be controlled in order to secure the body 105 to a cell tower or secure various tools 128 to the robot 100. In the embodiment illustrated, the body 105 includes a continuous track 140 and the magnets 141 are part of the treads of the continuous track 140. In some of these embodiments, the magnets 141 are selectively enable while being positioned within a predetermined position of the continuous track 140, and in particular, while being in a position to contact a portion of the cell tower (i.e. energized while in the predetermined position and de-energized while not within the predetermined position). In other embodiments, the magnets 141 are permanent magnets. In some embodiments, the magnets 141 are formed of a bendable material, such that the magnets 141 are configured to conform to any curvature in the portion of the cell tower that the magnets 141 come into contact with, such as the single tube 15 (refer to FIG. 2) and the straight rod 17 (refer to FIG. 3).

In embodiments, the body 105 includes storage compartments 125 configured to hold tools 128 and equipment. The tools 128 are configured for use during maintenance, installation, repairs, and the like. The equipment can be spare parts, replacement parts, removed parts, and the like. In some embodiments, the body 105 also includes elongated compartments 126. The elongated compartments 126 are configured to receive all or a portion of an arm 110. In embodiments, each arm 115 is configured stow within the body 105, such as by folding and moving into one of the elongated compartments 126.

The arms 110 include arm segments 111, joints 112 and a claw 113. The joints 112 are configured to provide multiple degrees of freedom between the arm segments 111, the body 105 and an arm segment 111, and the claw 113 and an arm segment 111. In embodiments, the joints 112 are configured for relative movement on multiple planes as well as rotation between the adjoining components.

In embodiments, the claw 113 includes at least two digits for gripping portions of the cell tower, such as climbing supports 36 and radio center platform 32 (refer to FIGS. 1 and 2), and for gripping tools 128 and components of the cell tower, such as cables, radios, antennas, and the like. In embodiments, the claw 113 includes one or more magnets 114 positioned at an interior of the digits of the claw 113. The one or more magnets 114 are configured to improve the grip of the claw 113 for both climbing and for holding and manipulating tools 128. In some embodiments, the one or more magnets 114 are selectively enabled while gripping a portion of the cell tower or tools 128 and are selectively disabled while not gripping a portion of the cell tower or tools 128.

In embodiments, the claw 113 includes an image sensor 115, such as a camera, positioned on one of the digits thereof. In the embodiment illustrated, the image sensor 115 is positioned at an end of a digit, distal to the arm segment 111 adjoining the claw 113. By being positioned at an end of the arm 110, the image sensor 115 can be utilized for inspecting difficult to reach areas and can be utilized for closely viewing the components that the robot is inspecting, installing, or repairing.

In embodiments, each of the arms 110 is configured to access the storage compartments 125 for inserting components therein and removing components therefrom.

While the embodiment illustrated includes three arms 110, with two at the front and one at the back, any number of arms 110 and configurations thereof are contemplated.

The monitoring equipment 130 includes one or more image sensors 131. In embodiments, the one or more image sensors 131 are positioned at a front of the body 105 and can be utilized for receiving feedback for controlling the robot 100 and for visually inspecting the cell tower and the components thereon.

In embodiments, the monitoring equipment 130 also includes other monitoring devices 132 including sensors, radios, spectrum analyzers, radio frequency (RF) sensors, a Global Positioning Satellite (GPS) measurement device, and the like that are utilized for auditing and inspecting the equipment on the cell tower. The RF sensors can be any device capable of making wireless measurements related to signals associated with the cell site components 14, i.e., the antennas 30. In embodiments, the monitoring devices 132 are modularly configured allowing for the easy exchange between monitoring devices 132 used by the robot 100 for auditing and inspecting the equipment on the cell tower. For example, when next generation equipment is installed on the cell tower, a respective monitoring device 132 can be provided to the robot 100, which exchanges the previous generation monitoring device 132 for the next generation monitoring device 132. In embodiments, the monitoring devices 132 are configured to be selectively enabled so as to only function while the robot 100 is auditing or inspecting equipment on the cell tower to reduce any interference that the robot 100 may cause with the equipment.

In some embodiments, the robot 100 also includes a tethering system 120. The tethering system includes a spool 123, a tether 122, and a fastener 121. The spool 123 is configured to wind and unwind the tether 122. The tether 122 can be a cable, rope, a power cable, a communications cable, a fiber optic cable, etc., i.e., any connection with the strength to prevent the robot 100 from falling off of the cell tower 12 or to support the weight of any components that the robot 100 may lift up the cell tower 12. The fastener 121 is configured to connect to various portions of the cell tower to prevent the robot 100 from falling therefrom. In embodiments, the tethering system 120 is also configured to attach to equipment for raising and lowering the equipment from the cell tower.

In some embodiments, the tether system 120 includes one or more winches 124 and one or more pulleys 127 that can be utilized for lifting equipment 14 with the tether system 120 and that can be utilized for maneuvering the robot 100.

In some embodiments, the robot 100 includes one or more solar panels 129 configured to charge the robot 100.

In some embodiments, the robot 100 is adapted to be used in adverse weather conditions (high wind, rain, snow, severe cold, etc.) and can include waterproof compartments and weather resilient components.

Figure 6:
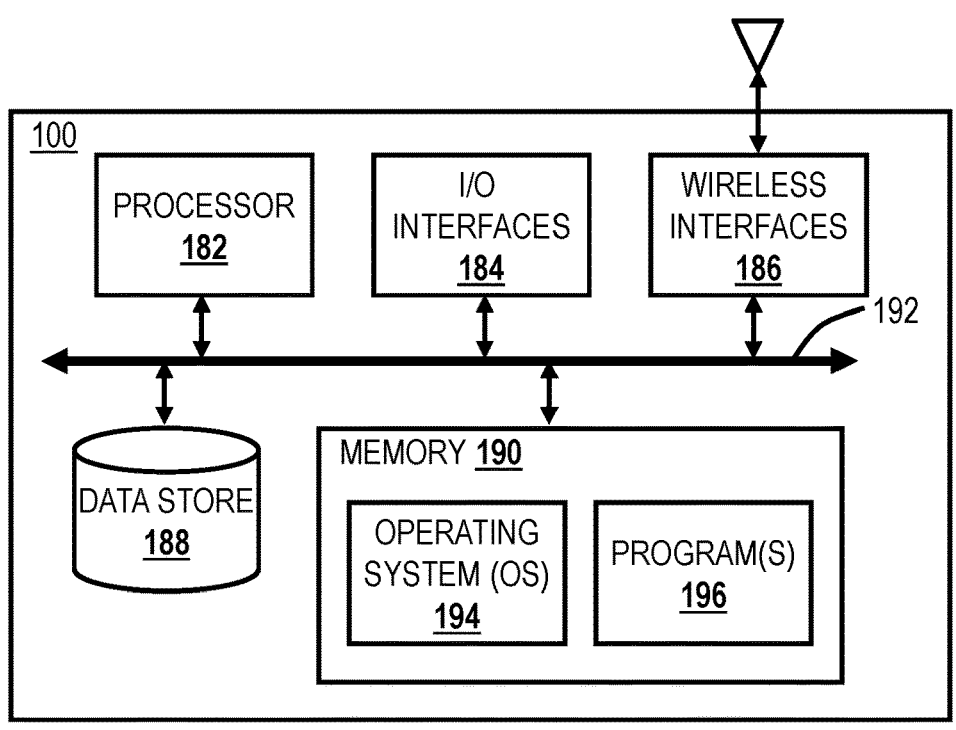
FIG. 6 is a block diagram of the robot of FIGS. 4 and 5 in accordance with the present disclosure.

FIG. 6 is a block diagram of the robot 100 of FIGS. 4 and 5 in accordance with the present disclosure. The robot 100 can include a digital device that, in terms of hardware architecture, generally includes a processor 182, input/output (I/O) interfaces 184, wireless interfaces 186, a data store 188, and memory 190. It should be appreciated by those of ordinary skill in the art that FIG. 6 depicts the robot 100 in an oversimplified manner, and a practical embodiment may include additional components and suitably configured processing logic to support known or conventional operating features that are not described in detail herein. The components (182, 184, 186, 188, and 190) are communicatively coupled via a local interface 192. The local interface 192 can be, for example, but not limited to, one or more buses or other wired or wireless connections, as is known in the art. The local interface 192 can have additional elements, which are omitted for simplicity, such as controllers, buffers (caches), drivers, repeaters, and receivers, among many others, to enable communications. Further, the local interface 192 may include address, control, and/or data connections to enable appropriate communications among the aforementioned components.

The processor 182 is a hardware device for executing software instructions. The processor 182 can be any custom made or commercially available processor, a central processing unit (CPU), an auxiliary processor among several processors associated with the robot 100, a semiconductor-based microprocessor (in the form of a microchip or chip set), or generally any device for executing software instructions. When the robot 100 is in operation, the processor 182 is configured to execute software stored within the memory 190, to communicate data to and from the memory 190, and to generally control operations of the robot 100 pursuant to the software instructions.

The I/O interfaces 184 can be used to receive user input from and/or for providing system output. User input can be provided via the controller 200, for example, a keyboard, mouse, a touch screen, VR system, and the like. System output can be provided via a display device such as a liquid crystal display (LCD), touch screen, VR system, and the like. The I/O interfaces 184 can also include, for example, a serial port, a parallel port, a small computer system interface (SCSI), an infrared (IR) interface, a radio frequency (RF) interface, a universal serial bus (USB) interface, and the like. The I/O interfaces 184 can include a graphical user interface (GUI) that enables a user to interact with the robot 100. Additionally, the I/O interfaces 184 may further include an imaging device, i.e. camera, video camera, etc.

The wireless interfaces 186 enable wireless communication to an external access device or network, such as the controller 200. Any number of suitable wireless data communication protocols, techniques, or methodologies can be supported by the wireless interfaces 186, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 186 can be used to communicate with the controller 200 for command and control as well as to relay data therebetween.

The data store 188 may be used to store data. The data store 188 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 188 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 can include one or more software programs, each of which includes an ordered listing of executable instructions for implementing logical functions. In the example of FIG. 5, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end user functionality with the mobile device 100, including performing various aspects of the systems and methods described herein.

In various embodiments, the robot 100 is configured to remain on the cell tower 12 in between inspections, audits, installations, and repairs (i.e. live on the cell tower 12). FIG.

Figure 7:
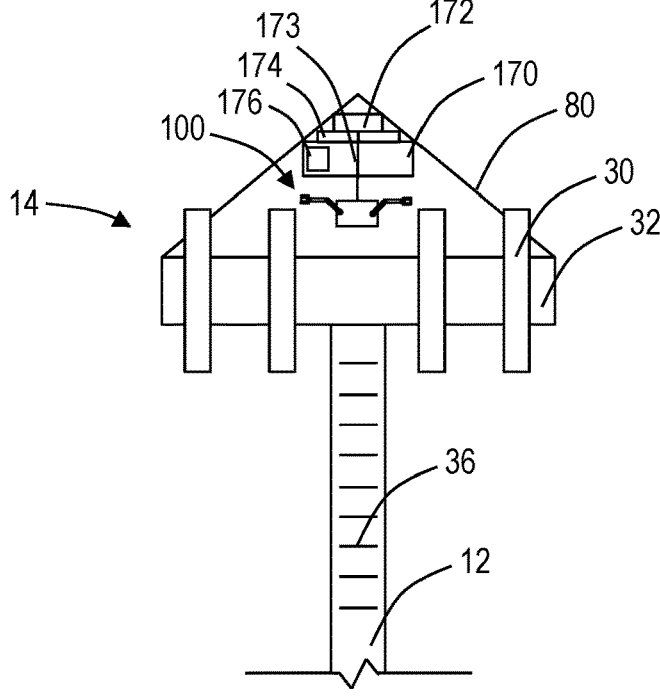
FIG. 7 is a schematic diagram of one embodiment of the robot housed on a cell tower in accordance with the present disclosure.
Figure 8:
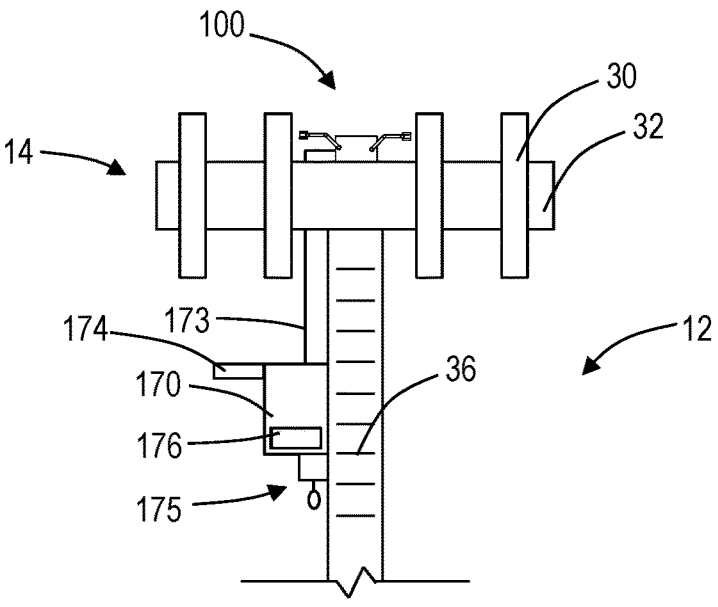
FIG. 8 is a schematic diagram of another embodiment of the robot housed on a cell tower in accordance with the present disclosure.

7 is a schematic diagram of one embodiment of the robot 100 housed on a cell tower 12 in accordance with the present disclosure. FIG. 8 is a schematic diagram of another embodiment of the robot 100 housed on a cell tower 12 in accordance with the present disclosure. Referring to FIGS. 7 and 8, in embodiments, the robot system 90 includes a docking station 170. The docking station 170 is configured to mount to the cell tower 12, directly or indirectly.

In the embodiment illustrated in FIG. 7, a support structure 80 is provided to position the docking station 170 above the radio center platform 32. As the radio center platform 32 is generally dedicated to cell site components 14, it is beneficial to position the docking station 170 off of the radio center platform 32. In some of these embodiments, the docking station 170 includes a tether 173 that is connected to the robot 100 and that is configured to support the robot 100 while lowering down to the radio center platform 32 and to secure the robot 100 to the tower. In the embodiment illustrated, the docking station 170 includes a spool 172 for the tether 173, which feeds the tether as needed for facilitating movement of the robot 100 about the cell tower 12. In this embodiment, the tether 173 always remains connected to the robot 100 and is configured to support the robot 100 in the event of an accident. In other embodiments, the robot includes the tether system 120 (refer to FIGS. 4 and 5) with the fastener 121 secured to the docking station 170. In some embodiments, the tether 173 is configured to provide power to the robot 100.

In the embodiment illustrated in FIG. 8, the docking station 170 is secured to the cell tower 12, such as to the lattice structure 13 (refer to FIG. 1), the single tube 15 (refer to FIG. 2), or the straight rod 17 (refer to FIG. 3). In this embodiment, the tether 173 always remains connected to the robot 100 and is configured to support the robot 100 in the event of an accident. In some embodiments, the docking station 170 includes a tether system 175, separate from the tether 173. The tether system 175 is configured to lift and lower equipment from the ground or lower on the tower and up to the docking station 170 to provide equipment to the robot 100 for performing any of inspections, audits, installations, repairs, and the like (audit tasks).

Figure 9:
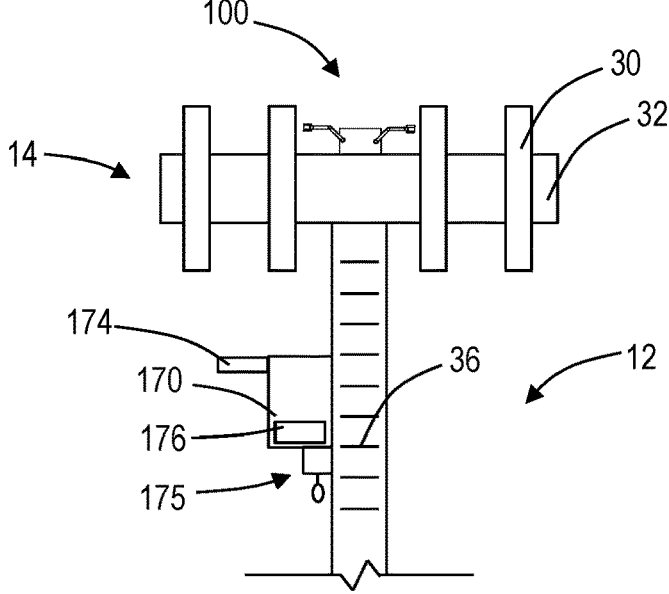
FIG. 9 is a schematic diagram of a further embodiment of the robot housed on a cell tower in accordance with the present disclosure.

FIG. 9 is a schematic diagram of a further embodiment of the robot 100 housed on a cell tower in accordance with the present disclosure. In the embodiment illustrated in FIG. 9, the robot 100 operates without a tether connecting the robot 100 to the docking station 170. In some of these embodiments, the docking station includes the tether system 175 for lifting and lowering equipment.

In embodiments, the docking station 170 includes solar panels 176 and a battery 176 configured for obtaining and storing power for the robot 100. In embodiments, the battery 176 functions as backup power for the robot 100. In some embodiments, the docking station 170 is configured to draw power from the cell tower 12. In some embodiments, the docking station 170 is configured to provide power to the robot 100 via the tether 173. In other embodiments, the docking station 170 provides power to the robot 100 while the robot 100 is docked thereat.

Figure 10:
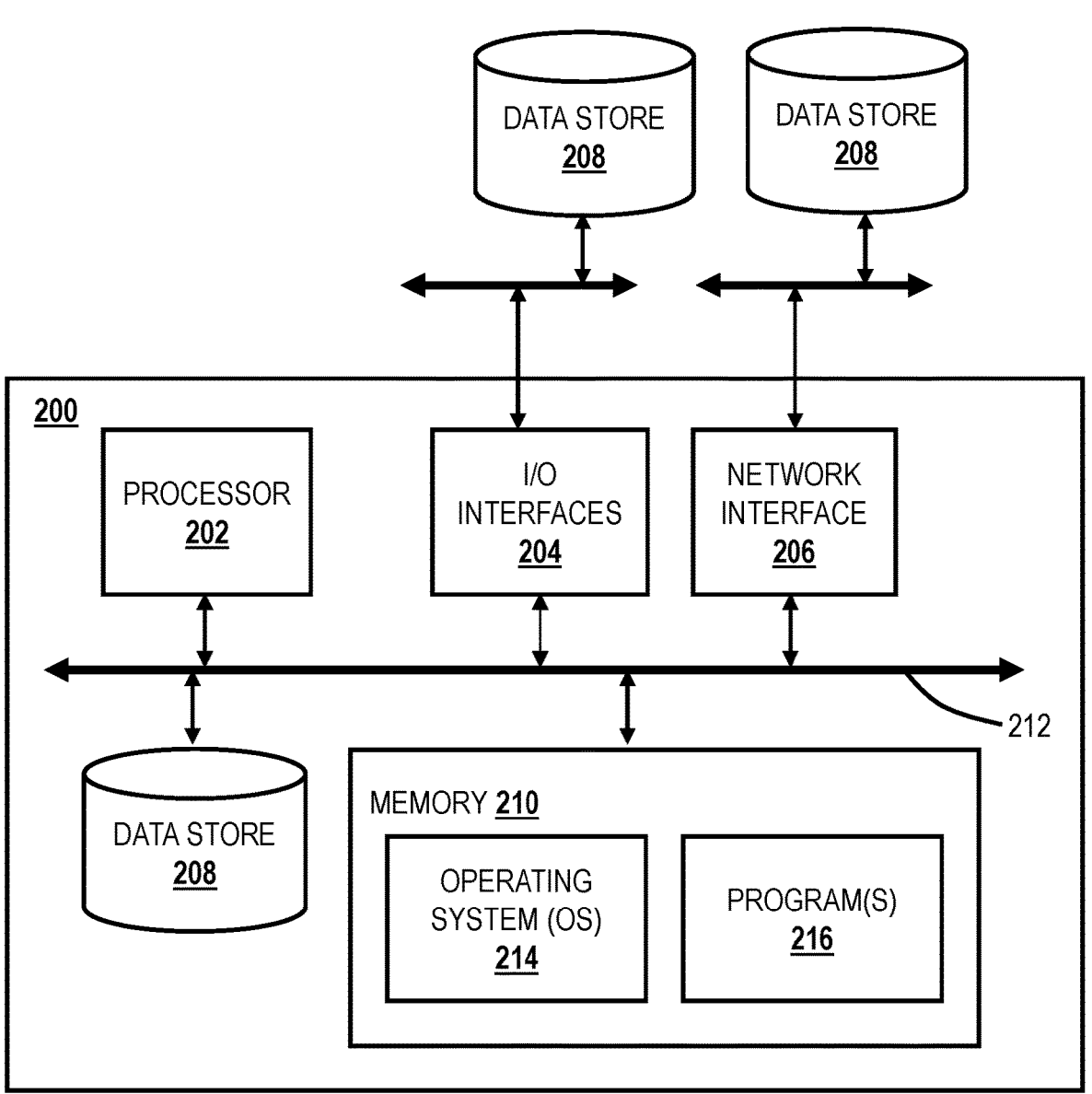
FIG. 10 is a block diagram of one embodiment of the controller of the robot system in accordance with the present disclosure.

FIG. 10 is a block diagram of one embodiment of the controller 200 of the robot system 90 in accordance with the present disclosure. In embodiments, the controller 200 is a digital computer that, in terms of hardware architecture, generally includes a processor 202, input/output (I/O) interfaces 204, a network interface 206, a data store 208, and memory 210. It should be appreciated by those of ordinary skill in the art that FIG. 10 depicts the controller 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory 210, to communicate data to and from the memory 210, and to generally control operations of the controller 200 and operations of the robot 100 pursuant to the software instructions. The I/O interfaces 204 may be used to receive user input from and/or for providing system output to one or more devices or components.

The network interface 206 may be used to enable the controller 200 to communicate on a network, such as the Internet, a Local Area Network, a cellular network, and the like. The network interface 206 may include, for example, an Ethernet card or adapter (e.g., 10 BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the controller 200, such as, for example, an internal hard drive connected to the local interface 212 in the controller 200. Additionally, in another embodiment, the data store 28 may be located external to the controller 200 such as, for example, an external hard drive connected to the I/O interfaces 204 (e.g., a SCSI or USB connection). In a further embodiment, the data store 208 may be connected to the controller 200 through a network, such as, for example, a network-attached file server.

In embodiments, the memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

FIG. 11 is a block diagram of one embodiment of a Virtual Reality (VR) System 300 for controlling the robot 100 in accordance with the present disclosure. In embodiments, the VR system 300 includes a headset 310 and one or more control components 320. In embodiments, the headset 310 includes all of the general components (202, 204, 206, 208, 210, and 212) described with regards to the controller 200. The headset 310 also includes a display 311. In embodiments, the display 310 is configured to present a Graphical User Interface (GUI) 311 for controlling the robot 100. In embodiments, the GUI 311 includes a primary display 312 that is configured to display a selected video feed from image sensors 131, 115 of the robot 100. In some embodiments, the GUI 311 includes secondary displays 313 configured to display video feeds from other image sensors 131, 115 of the robot 100. In some embodiments, the GUI 311 also includes a menu 314 that is configured to provide various control functionalities and menu options for controlling the robot 100, such as, controlling the video feeds, selecting which arms 110 of the robot 100 to manually control, providing commands to the robot 100, and the like. In some embodiments, the GUI 311 further includes a data feed 315, which provides data obtained from the robot 100, such as RF signals being monitored during an audit, and the like.

In embodiments, the control components 320 are wearable or handheld devices. In the embodiment illustrated, the control components 320 include gloves with multiple sensors 322 that are configured to detect movements of a person's hands and fingers. In embodiments, certain fingers of the gloves can be configured to control the digits of the claw 113 of the robot 100, such as to control gripping and manipulating objects thereby.

In various embodiments, the control components 320 include other wearable devices such as an exoskeleton suit adapted to send control signals to the robot 100. In these embodiments, the control components 320 allow a user to control the robot 100 movements to perform work and maneuver about the cell tower 12. The exoskeleton suit can include wearable components around a user's arms or wearable components around the user's entire body. The exoskeleton suit can additionally include an external display 312 or be used in combination with the VR system 300 described herein configured to display a selected video feed from image sensors 131, 115 of the robot 100. In embodiments, the exoskeleton suit may be worn by a user sitting down or standing up. In embodiments, a suit includes multiple sensors 322 that are configured to detect movements from the user's body. In embodiments, certain portions of the suit, such as the arms, can be configured to control the various arm segments 111 of the robot 100, such as to control and manipulate objects thereby.

§ 3.0 Cell Site Audits

As described herein, the cell site audit is used by service providers, third party engineering companies, tower operators, etc. to check and ensure proper installation, maintenance, and operation of the cell site components 14 and shelter or cabinet 40 equipment as well as the various interconnections between them. From a physical accessibility perspective, tower climbers access the cell site components 14 using the climbing supports 36 to climb up to the cell site components 14 and to the radio center platforms 32. The sets 20, 22, 24, 26 of the cell site components 14 can be sub-divided into sectors, such as into three sectors including an alpha sector, a beta sector, and a gamma sector.

In an exemplary embodiment, the robot 100 is utilized to perform the cell site audit in lieu of a tower climber. In the typical cell site audit, an engineer/technician is local to the cell site 10 to perform various tasks, which requires the engineer/technician to climb the cell tower 12. The systems and methods described herein eliminate a need for the engineer/technician to climb the cell tower 12.

In general, the cell site audit is performed to gather information and identify a state of the cell site 10. This is used to check the installation, maintenance, and/or operation of the cell site 10. Various aspects of the cell site audit can include, without limitation:

---

Verify the cell site 10 is built according to a current revision
Verify Equipment Labeling
Verify Coax Cable ("Coax") Bend Radius
Verify Coax Color Coding/Tagging
Check for Coax External Kinks & Dents
Verify Coax Ground Kits
Verify Coax Hanger/Support
Verify Coax Jumpers
Verify Coax Size
Check for Connector Stress & Distortion
Check for Connector Weatherproofing
Verify Correct Duplexers/Diplexers Installed
Verify Duplexer/Diplexer Mounting
Verify Duplexers/Diplexers Installed Correctly
Verify Fiber Paper
Verify Lacing & Tie Wraps
Check for Loose or Cross-Threaded Coax Connectors
Verify Return ("Ret") Cables
Verify Ret Connectors
Verify Ret Grounding
Verify Ret Installation
Verify Ret Lightning Protection Unit (LPI)
Check for Shelter/Cabinet Penetrations
Verify Surge Arrestor Installation/Grounding
Verify Site Cleanliness
Verify LTE GPS Antenna Installation

---

Of note, the cell site audit includes gathering information at and inside the shelter 40, on the cell tower 12, and at the cell site components 14. In embodiments, the robot 100 is configured to perform any of the tasks for a cell site audit disclosed herein, and in particular to inspect the cell tower 12, the cell site components 14, the radio center platforms 32, and the like. In some embodiments, the robot 100 is configured to climb down the cell tower 12 to inspect the equipment in the shelter 40. In some of these embodiments, the robot 100 is configured to access the shelter 40, such as by unlocking an access point thereto. In other embodiments, the equipment in the shelter 40 is inspected manually be an engineer/technician.

In some embodiments, the engineer/technician utilizes the controller 200, such as via the VR system 300 to guide the robot 100 to perform the audit. In embodiments, the robot 100 is controlled from a remote location. In other embodiments, the robot is controlled by an engineer/technician that is at the cell site 10. In other embodiments, the robot system 90 is configured to perform the audit autonomously via direct programming, machine learning, and the like.

FIG. 12 is a flow chart of an exemplary method 1200 for performing an audit of the cell site 10 utilizing a robot system 90. The method 1200 includes positioning a robot 100 on a cell tower 12 to perform an audit task chosen from inspecting and monitoring a component of the cell tower 12 at step 1202. In embodiments, step 1202 includes causing the robot to position one of the image sensors 115 directly at the component(s) being audited. In some of these embodiments, this requires the robot 100 to maneuver, such as via climbing or utilizing the tether, into a specific location on the cell tower 12 and then maneuvering one or more claws 115 to direct the image sensors 115 at the component(s) being audited.

The method 1200 also includes capturing data associated with the component(s) being audited based on the audit being performed at step 1204. In some embodiments, step 1204 includes capturing image data with the image sensors 115. In some embodiments, step 1204 requires the robot to activate RF sensors to capture RF data. Advantageously, the robot 100 is maneuvered to different locations on the cell tower 12 while capturing the RF data.

The method 1200 further includes processing the data collected to verify whether the component being audited is in a predetermined condition at step 1206. The predetermined condition being set based on standard conditions of components required for operation on a cell site 10. In some embodiments, the data is processed by providing the data for inspection to the engineer/technician. In other embodiments, the data is processed by the robot system 90 performing image comparisons between the data collected and previously categorized data as being in the predetermined condition or not in the predetermined condition.

§ 3.1 Antenna Down Tilt Angle

In an exemplary aspect of the cell site audit, the robot system 90 can be used to determine a down tilt angle of individual antennas 30 of the cell site components 14. The down tilt angle can be determined for all of the antennas 30 in all of the sectors. The down tilt angle is the mechanical (external) down tilt of the antennas 30 relative to a support bar, such as a radio center platforms 32. In the cell site audit, the down tilt angle is compared against an expected value, such as from a Radio Frequency (RF) data sheet, and the comparison may check to ensure the mechanical (external) down tilt is within ±1.0° of specification on the RF data sheet.

Using the robot system 90, the down tilt angle is determined from a photo taken from one of the image sensors 115, 131. In an exemplary embodiment, the robot system 90 is configured to measure three points—two defined by the antenna 30 and one by the support bar to determine the down tilt angle of the antenna 30. For example, the down tilt angle can be determined visually from the side of the antenna 30—measuring a triangle formed by a top of the antenna 30, a bottom of the antenna 30, and the support bar.

§ 3.2 Antenna Plumb

In an exemplary aspect of the cell site audit and similar to determining the down tilt angle, the robot system 90 can be used to visually inspect the antenna 30 including its mounting brackets and associated hardware. This can be done to verify appropriate hardware installation, to verify the hardware is not loose or missing, and to verify that antenna 30 is plumb relative to the support bar.

§ 3.3 Antenna Azimuth

In an exemplary aspect of the cell site audit, the robot system 90 can be used to verify the antenna azimuth, such as verifying the antenna azimuth is oriented within ±5° as defined on the RF data sheet. The azimuth (AZ) angle is the compass bearing, relative to true (geographic) north, of a point on the horizon directly beneath an observed object. Here, the robot system 90 can include a location determining device such as a GPS measurement device. The antenna azimuth can be determined with the robot system 90 using an aerial photo or the GPS measurement device.

§ 3.4 Photo Collections

As part of the cell site audit generally, the robot system 90 can be used to document various aspects of the cell site 10 by taking photos or video. For example, the robot system 90 can be used to take photos or video on the ground in or around the shelter 40 and can be used to take photos or video up the cell tower 12 and of the cell site components 14. The photos and video can be stored in any of the robot system 90, a cloud system associated with the robot system, and the like.

In an exemplary embodiment, the robot 100 can provide real-time video footage back to the controller 200 or another location (for example, a Network Operations Center (NOC) or the like) from any position on the cell tower 12.

§ 3.5 Data Capture—Cell Site Audit

The robot 100 can be used to capture various pieces of data via the image sensors 115, 131. That is, with the robot 100, the image sensors 115, 131 are equivalent to the engineer/technician's own eyes, thereby eliminating the need for the engineer/technician to physically climb the tower. One important aspect of the cell site audit is physically collecting various pieces of information—either to check records for consistency or to establish a record. For example, the data capture can include determining equipment module types, locations, connectivity, serial numbers, etc. from photos. The data capture can include determining physical dimensions from photos or from GPS such as the cell tower 12 height, width, depth, etc. The data capture can also include visual inspection of any aspect of the cell site 10, cell tower 12, cell site components 14, etc. including, but not limited to, physical characteristics, mechanical connectivity, cable connectivity, and the like.

The data capture can also include checking the lighting rod 16 and the warning light 18 on the cell tower 12. Also, with additional equipment on the robot 100, the robot 100 can be configured to perform maintenance such as replacing the warning light 18, etc. The data capture can also include checking maintenance status of the cell site components 14 visually as well as checking an associated connection status. Another aspect of the cell site audit can include checking the structural integrity of the cell tower 12 and the cell site components 14 via photos from the robot 100.

§ 4.0 Installing and Modifying Cell Tower Components

Additionally, the systems and methods described herein contemplate practically any activity at the cell site 10 using the robot system 90 in lieu of a tower climb. This can include, without limitation, any tower/equipment installation work, tower/equipment repair work, tower/equipment modification work, equipment reconfiguration, tower/equipment warranty work, tower operational ready work, tower construction work, tower decommissioning/deconstruction work, and the like.

Figure 13:
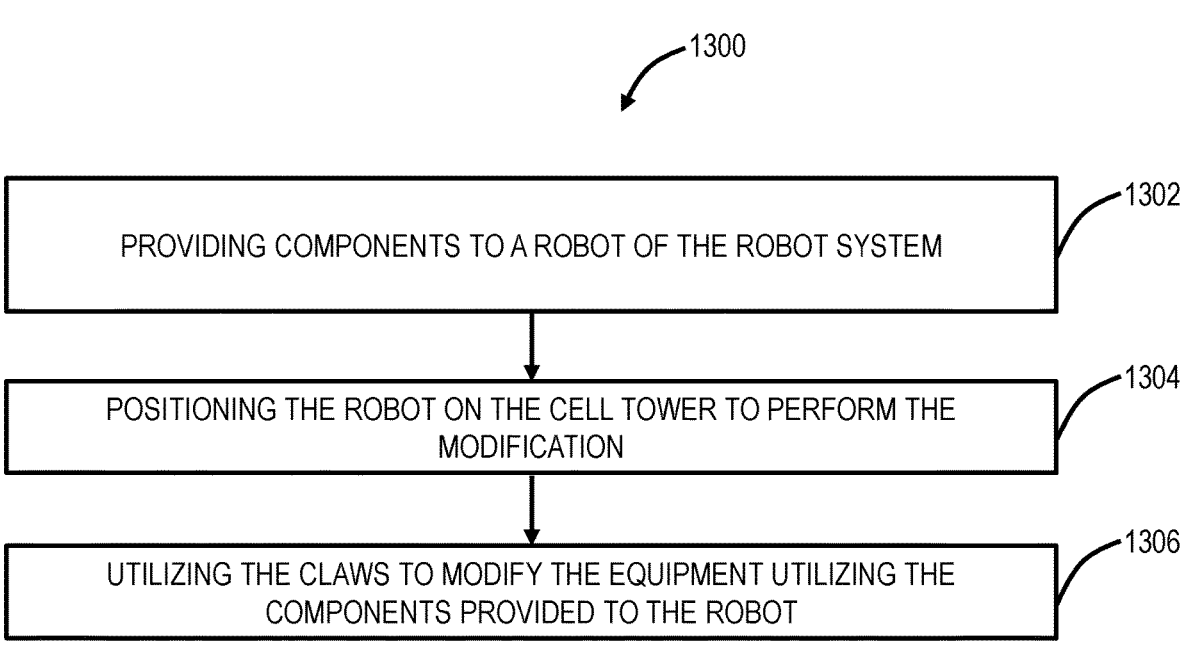
FIG. 13 is a flow chart of an exemplary method for modifying components of the cell site utilizing a robot system.

FIG. 13 is a flow chart of an exemplary method 1300 for modifying equipment of the cell site 10 utilizing a robot system 90. The method 1300 includes providing components to a robot 100 of the robot system 90 at step 1302. In embodiments, providing components to the robot 100 includes providing any of providing equipment to be installed, replacement parts, tools for performing the work, and the like to the robot 100. In some embodiments, the components are provided via the tether system 175. In other embodiments, the components are flown up to the robot 100 via a UAV 50 (refer to FIG. 14 described below). In further embodiments, the components are provided by connecting the components to a tether 122 connected to the robot 100. In some embodiments, the robot 100 climbs at least partially down the cell tower 12 to obtain the components.

The method also includes positioning the robot 100 on the cell tower 12 to perform the modification at step 1304. The method further includes utilizing the claws 113 to modify the equipment utilizing the components provided to the robot 100 at step 1306. In embodiments, the modifying includes installing equipment, replacing parts of the equipment, removing parts of the equipment, completely removing a piece of equipment, and the like.

Figure 14:
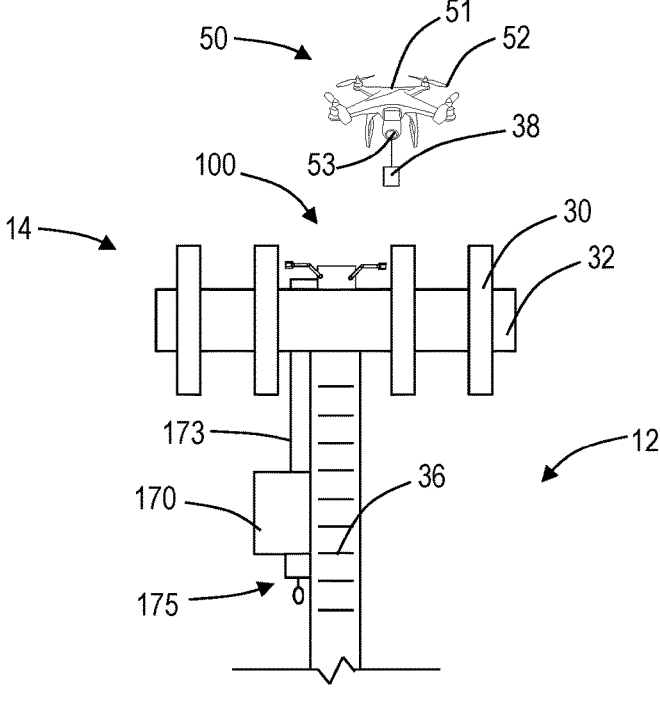
FIG. 14 is a schematic diagram of an embodiment of the robot on a cell tower coordinating with an Unmanned Aerial Vehicle (UAV) in accordance with the present disclosure.

FIG. 14 is a schematic diagram of an embodiment of the robot 100 on a cell tower 12 coordinating with a UAV 50 in accordance with the present disclosure. In embodiments, a UAV 50 is configured to coordinate with the robot 100 for supplying components 38 thereto. In embodiments, the UAV 50 utilizes a tether 53 to provide the components 38 to the robot 100. In embodiments, the UAV 50 is controlled by the controller 200, which coordinates movements therebetween. In other embodiments, the UAV 50 is controlled by another device, such as a separate controller, mobile device, and the like.

The UAV 50 may be referred to as a drone or the like. The UAV 50 may be a commercially available UAV platform that has been modified to carry specific electronic components. The UAV 50 includes rotors 52 attached to a body 51. A lower frame is located on a bottom portion of the body 51, for landing the UAV 50 to rest on a flat surface and absorb impact during landing. The UAV 50 also includes an image sensor 53, such as a camera, which is used to take still photographs, video, and the like. Specifically, the image sensor 53 is used to provide a real-time display on a screen for control of the UAV 50. The UAV 50 includes various electronic components inside the body 51 and/or the image sensor 53 such as, without limitation, a processor, a data store, memory, a wireless interface, and the like, which can be the same or similar to the components (182, 184, 186, 188, 190, 192) described with regards to the robot 100. Also, the UAV 50 can include additional hardware, such as robotic arms or the like that allow the UAV 50 to attach/detach components for the cell site components 14 and for delivery of components 38 to the robot 100. Specifically, it is expected that the UAV 50 will get bigger and more advanced, capable of carrying significant loads, and not just a wireless camera. The present disclosure contemplates using the UAV 50 for various aspects at the cell site 10, including participating in construction or deconstruction of the cell tower 12, the cell site components 14, etc.

Additionally, in embodiments, the systems and methods described herein contemplate use of the robot 100 and UAV 50 in coordination for performing any of the auditing procedures described herein.

§ 5.0 Robot System with UAV

Figure 15:
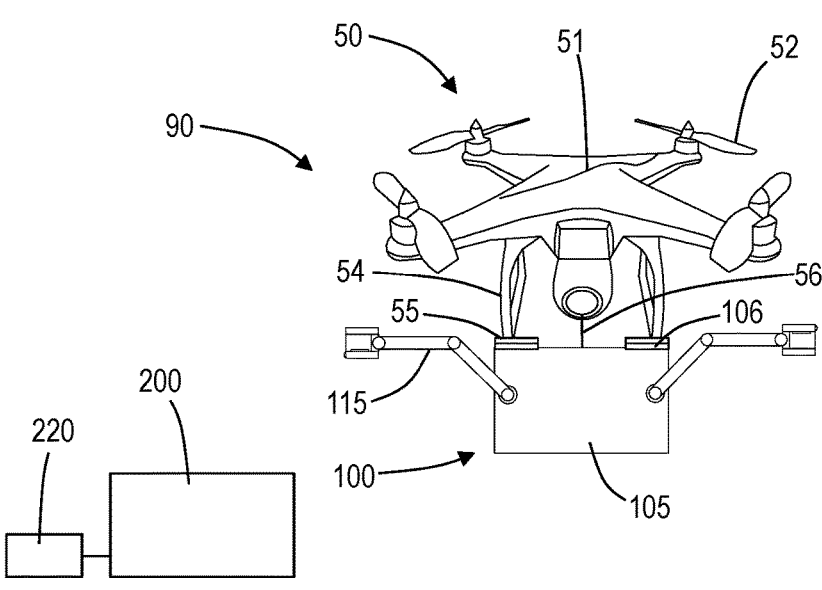
FIG. 15 is a schematic diagram of another exemplary robot system configured for inspecting, installing, reconfiguring, and repairing cellular equipment at a cell site in accordance with the present disclosure.

FIG. 15 is a schematic diagram of another exemplary robot system 90 configured for inspecting, installing, reconfiguring, and repairing cellular equipment 14 at a cell site 12 in accordance with the present disclosure. In some embodiments, the robot system 90 further includes a UAV 50. In some of these embodiments, the controller 200 is configured to control both the UAV 50 and the robot 100 and to coordinate movements there between.

In some embodiments, the UAV 50 is configured to transport the robot 100, such as to a top of the cell tower 12. In some of these embodiments, the UAV 50 includes a tether 56 configured to connect to the robot 100 for lifting the robot 100. In some embodiments, the UAV 50 includes magnets 55 mounted to a base 54 thereof. The magnets 55 are configured to secure the robot 100 to the UAV 50. In some of these embodiments, the robot 100 includes magnets 106 configured to secure the robot 100 to the base 54. In some embodiments, the magnets 106 include polarity opposite to the magnets 55 such that a connection can be formed therebetween. In some embodiments, the robot 100 is configured to grip the base 54 with the arms 115 for securing the robot 100 to the UAV 50 during flight. In embodiments, various combinations of the tether 56, the magnets 55, the magnets 106, and the arms 115 gripping the base 54 are utilized for securing the robot 100 to the UAV 50 during the transport of the robot 100 by the UAV 50. In some embodiments, the robot 100 is configured to stow the arms 115 during transport.

In embodiments, the magnets 55 and magnets 106 are permanent magnets. In other embodiments, the magnets 55 and magnets 106 are selectably enabled magnets that can be energized for magnetism and de-energized to release the magnetism, such as for forming the connection between the robot 100 and the UAV 50 and for releasing the connection between the robot 100 and the UAV 50.

In embodiments, the tether 56 is enabled to drop the robot 100 to the cell tower 12 and release the robot 100 on the cell tower 12.

In embodiments, the robot 100 includes the components of the UAV 50, allowing the robot 100 to preform the functions of the UAV 50 as well as the functions of the robot 100. This allows the robot 100 to fly to any location around the cell site 12 to perform work.

§ 6.0 Machine Learning in Robot Control

Machine learning can be used in various applications for controlling the robot 100. In particular use cases, machine learning can be used for controlling the robot 100 to inspect, monitor, install, reconfigure, or repair cellular equipment at a cell site. That is, a machine learning model is built and trained to control the robot, such as for inspecting, monitoring, installing, reconfiguring, or repairing cellular equipment at the cell site. The typical machine learning training process collects data samples, extracts a set of features from these samples, and feeds the features into a machine learning model to determine and recognize patterns related to the robot 100 and to cellular equipment. The output of this training process is one or more machine learning models that can control the robot 100 to perform various tasks and for recognizing and classifying conditions of cellular equipment.

Figure 16:
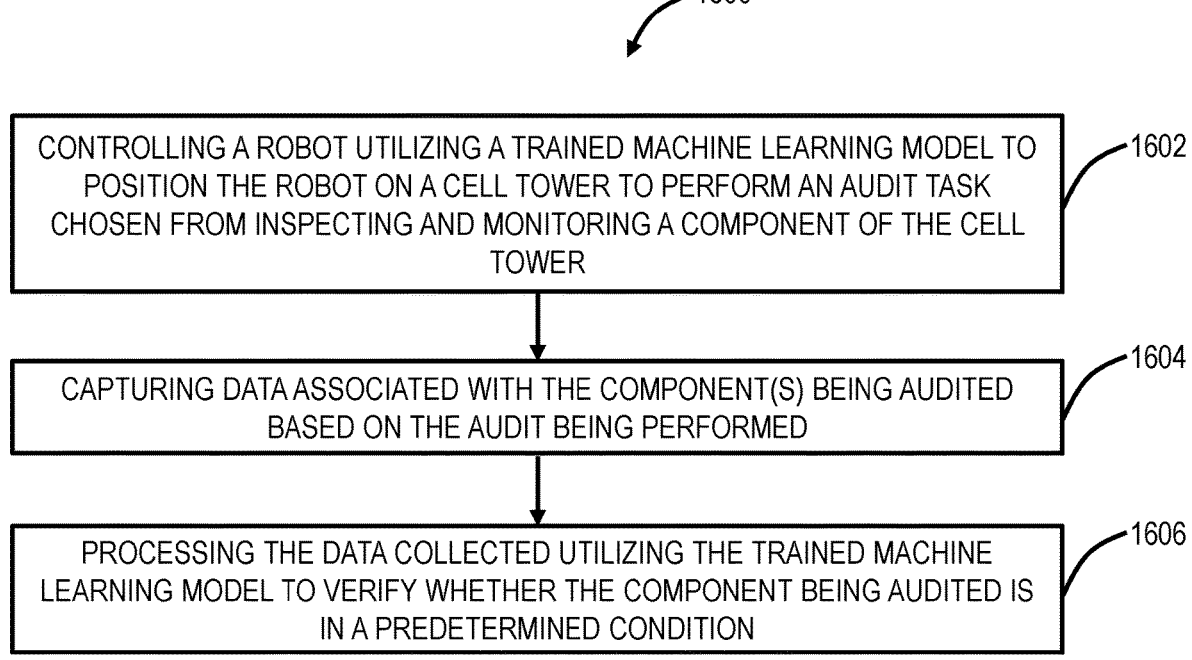
FIG. 16 is a flow chart of an exemplary method for modifying components of the cell site utilizing a robot system with a machine learning model.

FIG. 16 is a flow chart of an exemplary method 1600 for performing an audit of the cell site 10 utilizing a robot system 90. The method 1600 includes controlling a robot 100 utilizing a trained machine learning model to position the robot 100 on a cell tower 12 to perform an audit task chosen from inspecting and monitoring a component of the cell tower 12 at step 1602. In embodiments, step 1602 includes causing the robot 100 to position one of the image sensors 115 to capture images of the component(s) being audited. In some of these embodiments, this requires the robot 100 to maneuver, such as via climbing or utilizing the tether, into a specific location on the cell tower 12 and then maneuvering one or more claws 115 to direct the image sensors 115 towards the component(s) being audited.

The method 1600 also includes capturing data associated with the component(s) being audited based on the audit being performed at step 1604. In some embodiments, step 1604 includes capturing image data with the image sensors 115. In some embodiments, step 1604 requires the robot to activate RF sensors to capture RF data. Advantageously, the robot 100 is maneuvered to different locations on the cell tower 12 while capturing the RF data.

The method 1600 further includes processing the data collected utilizing the trained machine learning model to verify whether the component being audited is in a predetermined condition at step 1606. The predetermined condition being set based on standard conditions of components required for operation on a cell site 10.

FIG. 17 is a flow chart of an exemplary method 1700 for modifying equipment of the cell site 10 utilizing a robot system 90. The method 1700 includes providing components to a robot 100 of the robot system 90 at step 1702. In embodiments, providing components to the robot 100 includes providing any of providing equipment to be installed, replacement parts, tools for performing the work, and the like to the robot 100. In some embodiments, the components are provided via the tether system 175. In other embodiments, the components are flown up to the robot 100 via a UAV 50 (refer to FIG. 14 described below). In further embodiments, the components are provided by connecting the components to a tether 122 connected to the robot 100. In some embodiments, the robot 100 climbs at least partially down the cell tower 12 to obtain the components. In some embodiments, the robot 100 is autonomously controlled by a trained learning model to receive the components.

The method also includes controlling the robot 100 with a trained learning model to position the robot 100 on the cell tower 12 to perform the modification at step 1704. The method further includes controlling the claws 113 with the trained learning model to modify the equipment utilizing the components provided to the robot 100 at step 1706. In embodiments, the modifying includes installing equipment, replacing parts of the equipment, removing parts of the equipment, completely removing a piece of equipment, and the like.

In embodiments, the controlling of the robot is performed by the machine learning model. In other embodiments, the controlling of the robot is performed wirelessly by a user at the cell tower site, by a user in a remote location, or by an imbedded program. In embodiments, the wireless control of the robot is facilitated by the control components contemplated herein.

In some embodiments, there is a single trained machine learning model. In other embodiments, there are multiple trained machine learning models, and the controller selects the trained model for controlling the robot 100 based on which tasks need to be performed by the robot 100. For example, in one embodiment, one trained machine learning model is utilized for maneuvering the robot 100, another trained machine learning model is utilized for obtaining data for an audit, and a further trained machine learning model is utilized for processing the data collected.

The trained machine learning model(s) for performing audits can be trained using labeled log data labeling decisions made during the audits, the type of audit, and images captured during the audit. The trained machine learning model(s) for controlling the robot 100 can be trained using input data for manually controlling movements of the robot 100, images capture during the manual control, sensor data captured during the control, positions of the various components and parts of the robot 100, and the like.

Again, in various embodiments, the robot 100 is configured to remain on the cell tower 12 in between inspections, audits, installations, and repairs (i.e. live on the cell tower 12). Referring again to FIGS. 7 and 8, in embodiments, the cell tower 12 includes a docking station 170. The docking station 170 is configured to mount to the cell tower 12, directly or indirectly.

FIG. 18 is a flow chart of an exemplary method 1800 for modifying equipment of the cell site 10 utilizing a robot 100. The method 1800 includes causing a robot to leave a docking station on a cell tower to perform an audit task 1802. In embodiments, the steps also include providing components to the robot 100, the providing includes providing any of equipment to be installed, replacement parts, tools for performing the work, and the like to the robot 100. In some embodiments, the components are provided via the tether system 175. In other embodiments, the components are flown up to the robot 100 via a UAV 50. In further embodiments, the components are provided by connecting the components to a tether 122 connected to the robot 100. In some embodiments, the robot 100 climbs at least partially down the cell tower 12 to obtain the components. In some embodiments, the robot 100 is autonomously controlled by a trained learning model to receive the components.

In some embodiments, the causing of the robot 100 to leave the docking station 170 may be triggered by a user controlling the robot 100 or an imbedded program following predetermined inspection schedules for the robot 100 to perform. Some embodiments may utilize a trained model to determine an audit schedule.

The method 1800 also includes controlling the robot 100 to position the robot 100 on the cell tower 12 to perform the audit task at step 1804. The method 1800 also includes controlling the robot 100 to perform the audit task at step 1806. Again, in various embodiments, the controlling of the robot 100 is performed by the machine learning model. In other embodiments, the controlling of the robot is performed wirelessly by a user at the cell tower site, by a user in a remote location, or by an imbedded program. In embodiments, the wireless control of the robot is facilitated by the control components contemplated herein.

The method 1800 further includes causing the robot 100 to return to the docking station 170. Again, the causing of the robot 100 to return to the docking station 170 may be triggered by a user controlling the robot 100, an imbedded program, or a trained model which determines audit tasks are completed.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A robot system for performing audit tasks of cell towers, the robot system comprising:
   a docking station permanently secured on a portion of the cell tower via a dedicated support structure, the docking station configured to house and recharge a robot when the robot is not in use, the docking station comprising a tether operably connected to the robot and configured to provide power and prevent the robot from falling from the cell tower; and
   a robot configured to live on the cell tower via the docking station, wherein the robot comprises
      a body portion configured to hold various electronic components of the robot comprising monitoring equipment disposed thereon;
      a continuous track disposed on a lower surface of the body portion and comprising a plurality of selectively enabled magnets configured to secure the robot to the cell tower while facilitating movement of the robot along the tower;
      one or more arms extending from the body portion adapted to manipulate components of a cell tower and to facilitate movement of the robot on the cell tower; and
      wireless interfaces adapted to allow wireless control of the robot.

2. The robot system of claim 1, wherein the robot is configured to receive power from the docking station.

3. The robot system of claim 1, wherein the docking station comprises one or more solar panels and batteries configured to obtain and store power for the robot.

4. The robot system of claim 1, wherein the docking station is structurally integrated with the cell tower and configured to draw power from existing electrical infrastructure of the cell tower.

5. The robot system of claim 1, wherein the one or more arms of the robot further comprise claws adapted to grip tools and components of the cell tower, each claw including at least one image sensor disposed proximate a distal end of the claw for capturing image data of areas of the cell tower that are difficult to access.

6. The robot system of claim 1, wherein the magnets embedded within the continuous track are configured to be selectively energized when in contact with a metallic surface of the cell lower to provide traction and de-energized when not in contact.

7. The robot system of claim 1, wherein the robot is configured to be controlled by one of a user in a remote location, a user at the cell tower site, and autonomously via direct programing.

8. A cell tower comprising:
   a docking station permanently secured on a portion of the cell tower via a dedicated support structure, the docking station configured to house and recharge a robot when the robot is not in use, the docking station comprising a tether operably connected to the robot and configured to provide power and prevent the robot from falling from the cell tower; and
   a robot configured to live on the cell tower via the docking station, wherein the robot comprises
      a body portion configured to hold various electronic components of the robot comprising monitoring equipment disposed thereon;
      a continuous track disposed on a lower surface of the body portion and comprising a plurality of selectively enabled magnets configured to secure the robot to the cell tower while facilitating movement of the robot along the tower;
      one or more arms extending from the body portion adapted to manipulate components of a cell tower and to facilitate movement of the robot on the cell tower; and
      wireless interfaces adapted to allow wireless control of the robot.

9. The cell tower of claim 8, wherein the robot is configured to receive power from the docking station.

10. The cell tower of claim 8, wherein the docking station comprises one or more solar panels and batteries configured to obtain and store power for the robot.

11. The cell tower of claim 8, wherein the docking station is structurally integrated with the cell tower and configured to draw power from existing electrical infrastructure of the cell tower.

12. The cell tower of claim 8, wherein the one or more arms of the robot further comprise claws adapted to grip tools and components of the cell tower, each claw including at least one image sensor disposed proximate a distal end of the claw for capturing image data of areas of the cell tower that are difficult to access.

13. The cell tower of claim 8, wherein the magnets embedded within the continuous track are configured to be selectively energized when in contact with a metallic surface of the cell tower to provide traction and de-energized when not in contact.

14. The cell tower of claim 8, wherein the robot is configured to be controlled by one of a user in a remote location, a user at the cell tower site, and autonomously via direct programing.

15. A method comprising the steps of:

causing a robot to leave a docking station permanently affixed to a cell tower via a dedicated support structure, the docking station being configured to house and recharge the robot and comprising a tether operably connected to the robot to provide power and prevent the robot from falling from the cell tower, to perform an audit task;

positioning the robot on the cell tower to perform the audit task chosen from a plurality of operations to the cell tower, wherein the robot comprises a continuous track including a plurality of selectively enabled magnets configured to secure the robot to the cell tower while facilitating movement along the cell tower;

causing the robot to perform the audit task; and causing the robot to return to the docking station.

16. The method of claim 15, wherein the plurality of operations include any of inspecting and monitoring a component of the cell tower, performing repair, and installing components of the cell tower.

17. The method of claim 15, further comprising the step of providing components to the robot utilizing one of a winch and an Unmanned Aerial Vehicle (UAV).

18. The method of claim 15, further comprising the step of providing power to the robot by way of the docking station.

* * * * *